United States Patent
Wissell et al.

(10) Patent No.: US 6,424,513 B1
(45) Date of Patent: Jul. 23, 2002

(54) SHORT CIRCUIT PROTECTION MODULE

(75) Inventors: Daniel Wissell, Acton; Denise McAuliffe, Sterling; Bernard Nolan, North Falmouth, all of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/575,930

(22) Filed: May 23, 2000

(51) Int. Cl.$^7$ ................................................. H02H 3/00
(52) U.S. Cl. ...................... 361/93.1; 361/100
(58) Field of Search ................ 361/93.1, 100, 361/115

(56) References Cited

U.S. PATENT DOCUMENTS

| | | | |
|---|---|---|---|
| 4,490,620 A | * 12/1984 | Hansen | 290/38 R |
| 4,731,721 A | * 3/1988 | Igashira et al. | 363/56 |
| 5,224,010 A | 6/1993 | Tran et al. | 361/90 |
| 5,416,689 A | 5/1995 | Silverstein et al. | 363/56 |
| 5,550,729 A | 8/1996 | Wissell | 363/65 |
| 5,691,870 A | 11/1997 | Gebara | 361/86 |

* cited by examiner

*Primary Examiner*—Stephen W. Jackson
(74) *Attorney, Agent, or Firm*—Cesari and McKenna, LLP

(57) ABSTRACT

A short circuit protection device, which includes a comparator with a non-inverting input port, an inverting input port, and an output port, is used with first and second voltage reference signals obtained from a power supply to indicate a short-circuit condition in the power supply when the reference signals are the same. A first voltage divider is connected to the power plane of the power supply and provides the first reference signal to the non-inverting input port, and a second voltage divider is connected to the output port of the power supply and provides the second reference signal to the inverting input port, where the second reference signal is normally smaller than the first reference signal. A first time constant between the first voltage divider and the non-inverting input port provides a first time delay to the first reference signal, and a second time constant between the second voltage divider and the inverting input port provides a second time delay to the second reference signal, where the second time delay is greater than the first time delay. When a short-circuit condition occurs, the voltage levels of the reference signals become the same, changing the status signal at the comparator output port and, optionally, signaling a power-down of the power supply.

30 Claims, 7 Drawing Sheets

SHORT CIRCUIT PROTECTION MODULE

BACKGROUND OF THE INVENTION

1. Field of the Invention

The present invention is related to the protection of electronic systems and, in particular, to a high-speed short circuit protection module.

2. Background Information

Reliable high-speed short circuit detection presents a challenge to the circuit designer for a number of reasons. For example, the short-circuit protection device must be able to correctly distinguish among a voltage drop caused by a short circuit, a voltage drop resulting from a load power requirement, a voltage drop caused by switching noise, and a voltage drop caused by removal and replacement of the power supply. That is, a fault signal should be generated only in response to the occurrence of a short circuit condition. It is undesirable for an electronic system to be inadvertently powered down because of noise, variable power demand, or routine maintenance of the system.

Additionally, if the short-circuit protection device is used with a low impedance power system, such as commonly found in high-current computer systems, the power system exhibits a very low voltage drop at high current loads. Moreover, in certain applications, the voltage to be monitored is the same voltage used to power the short circuit detection circuitry. It then becomes a requirement that the detection circuitry self-bias as no other 'start-up' voltage is available.

What is needed is an improved, high-speed, short circuit protection module, and it is an object of the present invention to provide such a device.

It is a further object of the present invention to provide a method of distinguishing a short-circuit condition from the occurrence of high-frequency noise.

It is another object of the present invention to provide a short-circuit protection module which allows for the replacement of a power supply without causing a power-down of the electronic system.

It is yet another object of the present invention to provide a short circuit protection module which can be used to monitor its own supply voltage. Other objects of the invention will be obvious, in part, and, in part, will become apparent when reading the detailed description to follow.

SUMMARY OF THE INVENTION

The disclosed short circuit protection device exhibits a very short response time, is not triggered by high-frequency noise, and provides for normal power down or removal of a monitored power supply without shutting down the entire electronic system. In a first embodiment the protection device includes a comparator with a non-inverting input port, an inverting input port, and an output port, and is used with first and second voltage reference signals obtained from the power supply to indicate a short-circuit condition when the reference signals are the same. A first voltage divider is connected to the power plane of the monitored power supply and provides the first reference signal to the non-inverting input port, and a second voltage divider is connected to the power supply output and provides the second reference signal to the inverting input port, where the second reference signal is normally smaller than the first reference signal.

A first time constant between the first voltage divider and the non-inverting input port provides a first time delay to the first reference signal, and a second time constant between the second voltage divider and the inverting input port provides a second time delay to the second reference signal, where the second time delay is greater than the first time delay. When a short-circuit condition occurs, the voltage levels of the reference signals become the same, changing the status signal at the comparator output port, and signaling a power-down of the power supply. In a second embodiment, a diode and the first voltage divider are connected to the power supply output and the second voltage divider is connected to the diode.

A short circuit protection system includes a short circuit protection device in accordance with the first embodiment and at least one short circuit protection device in accordance with the second embodiment, where the output of the first embodiment protection device and the output of the one or more second embodiment protection device(s) are connected to a fault signal subcircuit. The output of the fault signal subcircuit provides a status of the two or more monitored power supplies, where the fault signal circuit output assumes a first logic state when the voltage levels of all first reference signals remains greater than the corresponding second reference signals. On the other hand, the fault signal circuit output assumes a second logic state, indicating the presence of a short circuit condition in one of the power supplies, when at least one first reference signal is the same as the corresponding second reference signal.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
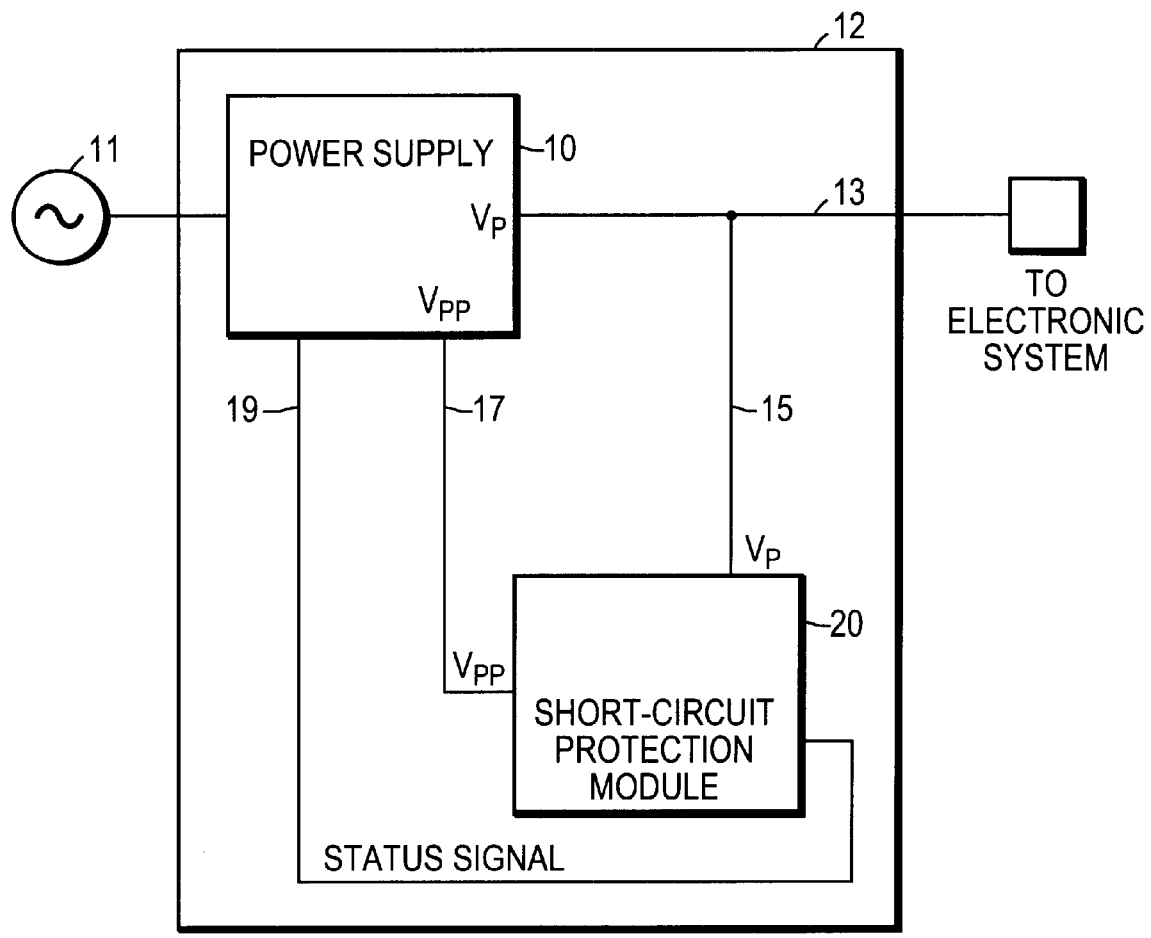
FIG. 1 is an electrical block diagram including a power supply connected to a short circuit protection module, in accordance with the present invention.

FIG. 1 is an electrical block diagram showing a power supply 10 connected to a short circuit protection module 20 in accordance with the present invention. The power supply 10 converts power provided by an external source 11 into a power supply output voltage $V_P$ on an output line 13 for use by, for example, an electronic system such as a computer (not shown). The output voltage $V_P$ is also used to power the short circuit protection module 20 via a module power line 15. The short circuit protection module 20 monitors the power supply output voltage $V_P$ at the power plane, denoted by $V_{PP}$, via a voltage reference line 17. If the short circuit protection module 20 detects a short circuit condition on the board of the power supply 10, a corresponding short circuit status signal provided via a status signal line 19 is used to shut down the power supply 10. In an alternative embodiment, the power supply 10 and the short circuit protection module 20 are integrated on a single system board 12.

Figure 2:
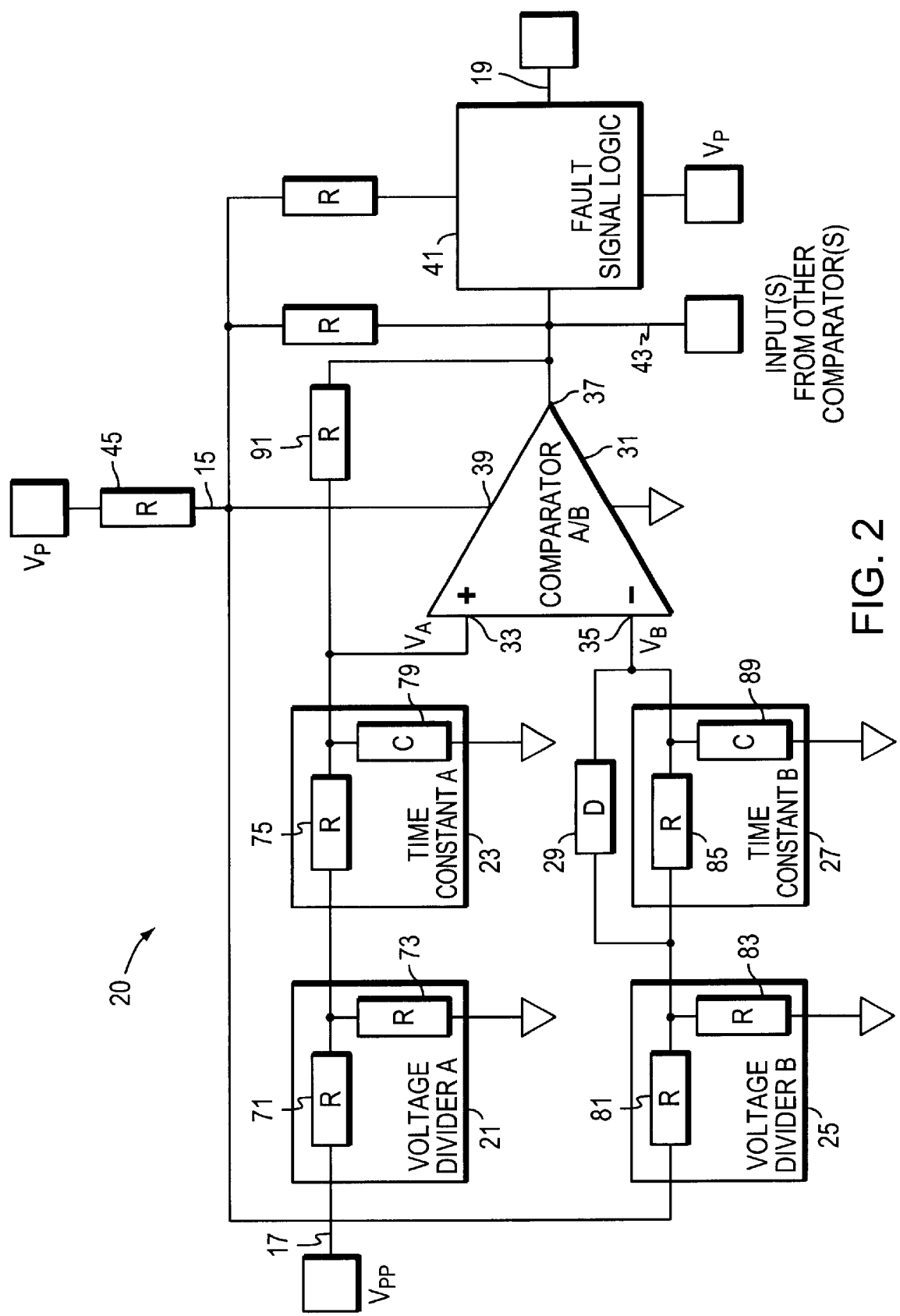
FIG. 2 is a detailed functional block diagram of the short-circuit protection module of FIG. 1.

Referring also to FIG. 2, the short circuit protection module 20 includes a first voltage divider 21 for receiving the power plane voltage $V_{PP}$ on the voltage reference line 17, and a second voltage divider 25 for receiving the output voltage $V_P$ on the module power line 15. The first voltage divider 21 provides a power plane voltage reference signal $V_A$ to the non-inverting input port 33 of a comparator 31 by way of a first time constant subcircuit 23. The second voltage divider 25 provides an output voltage reference signal $V_B$ to the inverting input port 35 of the comparator 31 by way of a second time constant subcircuit 27. The values of resistive elements 71, 73, 81, and 83 are specified such that the power plane voltage reference signal $V_A$ is greater than the output voltage reference signal $V_B$. In a preferred embodiment, the comparator 31 is an analog device and the voltage differential ($V_A$–$V_B$) at the inputs 33 and 35 is on the order of 100 millivolts. A feedback resistance 91 is provided between the output port 37 and the non-inverting input port 33 to provide a positive feedback configuration and, thus, to insure that the non-inverting input port 33 is held at a potential above that of module ground.

If, during operation of the short circuit protection module 20, the voltage signal $V_A$ at the non-inverting input port 33 drops below the level of the voltage signal $V_B$ at the inverting input port 35, a corresponding short circuit status signal is sent onto the status signal line 19, preferably via a fault signal subcircuit 41 as described in greater detail below. When used in the short circuit protection module 20, the fault signal subcircuit 41 provides a stronger signal than the signal output by the comparator 31 alone. A stronger short circuit status signal may be needed if the physical separation between the power supply 10 and the short circuit protection module 20 is significant. Alternatively, for a configuration in which the power supply 10 and the short circuit protection module 20 are on the single system board 12, the fault signal subcircuit 41 may be optional.

The output voltage $V_P$ is provided to a power supply pin 39 of the comparator 31 via the module power line 15 as shown. In a preferred embodiment, the short circuit protection module 20 includes a module power line impedance 45 to limit the current in the module power line 15 in the event of a short-circuit condition in the power supply 10. For an output voltage $V_P$ of 3.3 volts, for example, the impedance 45 may be about 300 milliohms. The impedance 45 can be provided by a discrete component on the circuit board of the short circuit protection module 20, for example, or can be formed from a relatively high impedance conductive path provided on the circuit board between a module interface connector pin (not shown) and the power supply pin 39 of the comparator 31.

During normal power-up of the power supply 10, the voltage level at the power supply pin 39 reaches the operational value of $V_P$ relatively quickly. After the comparator 31 is powered up and functioning, the power plane voltage reference signal $V_A$ can be detected at the non-inverting input port 33 and the output voltage reference signal $V_B$ can be detected at the inverting input port 35. Because of the time constant subcircuits 23 and 27 in series with the respective voltage dividers 21 and 25, the normal levels of the power plane voltage reference signal $V_A$ and the output voltage reference signal $V_B$ are not attained at the respective inputs 33 and 35 until after the comparator 31 is properly functioning. This initialization sequence insures that, if a short circuit is present in the power supply 10 at power-up, the comparator 31 can detect the short circuit condition and shut down the power supply 10 before damage to the electronic system results.

Figure 3:
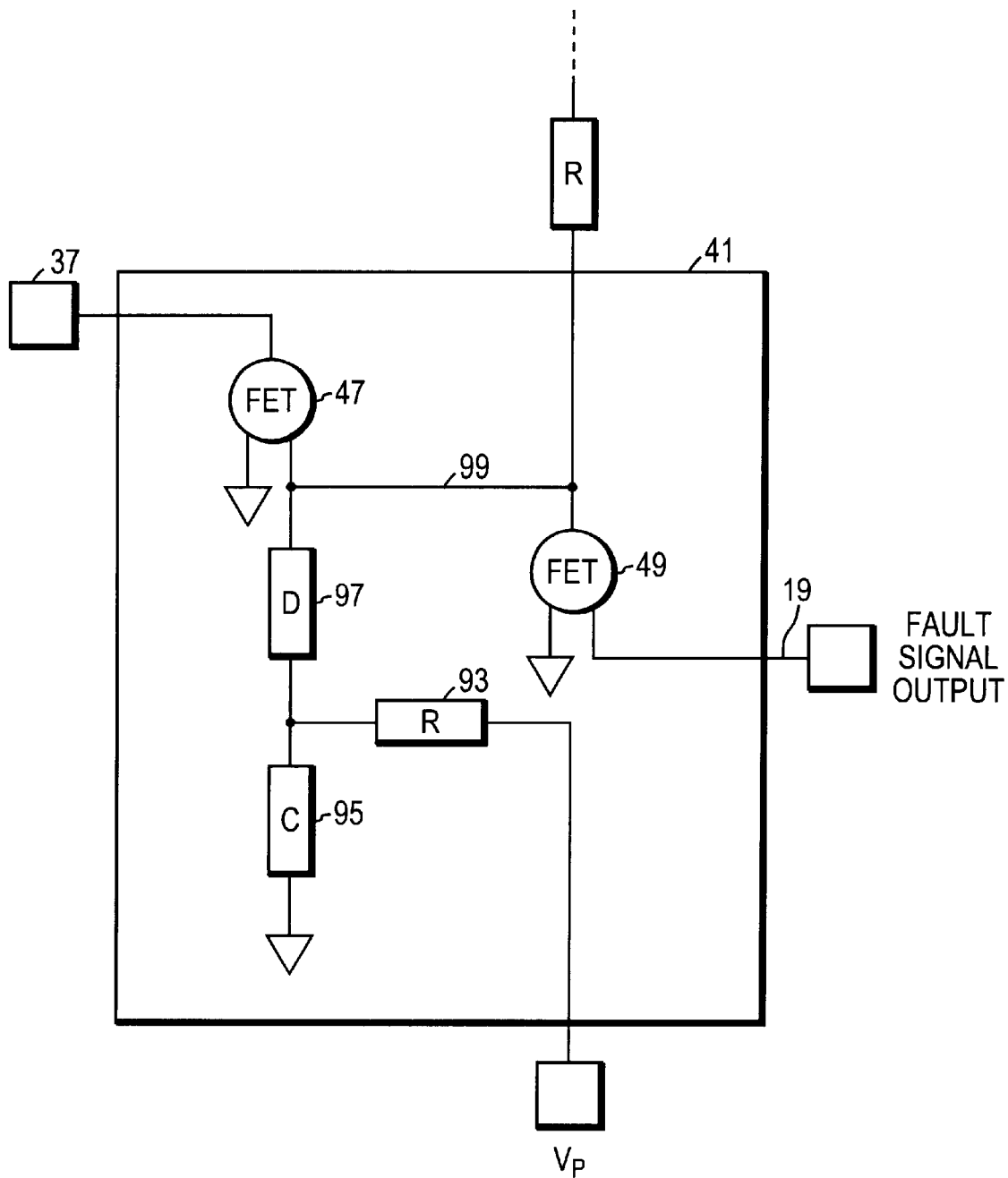
FIG. 3 is a detailed circuit diagram of a fault signal component of the short circuit protection module of FIG. 2.

In a preferred embodiment, the comparator 31 is an open-drain operational amplifier. When signal $V_A$ is greater than signal $V_B$, output port 37 of the comparator 31 is HIGH. As can be appreciated by one skilled in the relevant art, a HIGH at the output port 37 applied to the fault signal subcircuit 41, in FIG. 3, turns a first transistor 47 HIGH. As the first transistor 47 goes HIGH, a second transistor 49 is held LOW, providing a LOW signal. As explained in greater detail below, a LOW signal on the status signal line 19 indicates that a short circuit condition is not present and the power supply 10 continues providing power. When signal $V_A$ is the same as signal $V_B$, the output port 37 goes LOW, the first transistor 47 is held LOW, and the second transistor 49 goes HIGH. When this occurs, the HIGH signal on the status signal line 19 indicates the presence of a short circuit condition and the power supply 10 is signaled to power down.

The fault signal subcircuit 41 preferably includes a resistance 93 in series with a diode 97 for providing the output voltage $V_P$ to a line 99 which connects the transistors 47 and 49. A capacitance 95 provides for an RC delay to the output voltage $V_P$ of several milliseconds in conjunction with the resistance 93. With this configuration, if either the comparator 31 or the first transistor 47 is not functioning properly within the RC time period, the output voltage $V_P$ will be applied to the line 99, force the gate of the second transistor 49 HIGH, and signal that a fault exists within the short circuit protection module 20. On the other hand, if the comparator 31 and the first transistor 47 function properly within the RC time period, the first transistor 47 holds the line 99 LOW, and no fault signal is transmitted.

Figure 4:
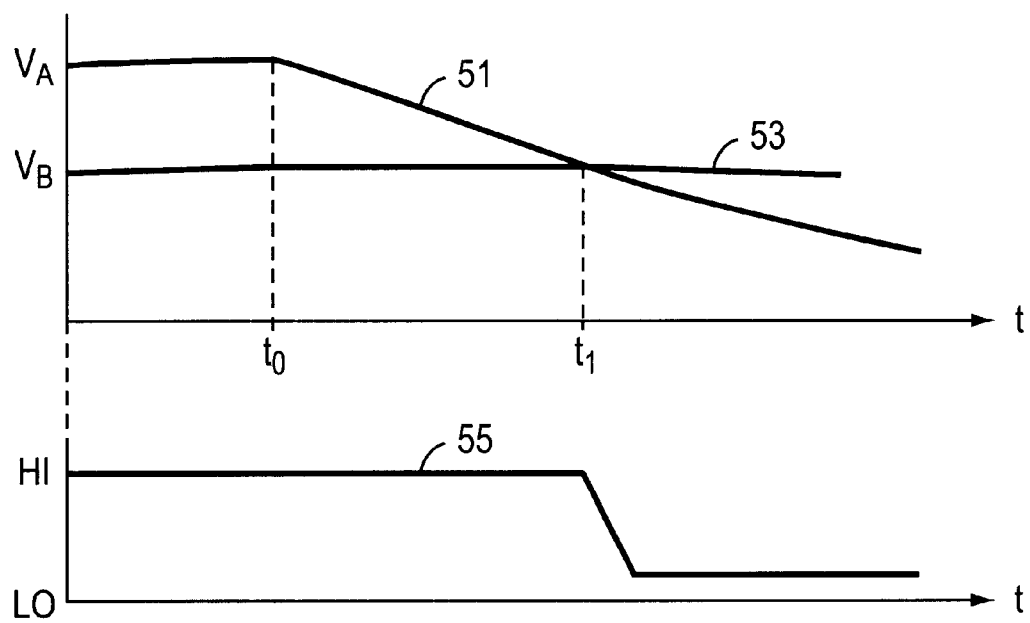
FIG. 4 is a set of curves including the output curve of a comparator and the voltage characteristics of two reference signals, generated in response to a short circuit event in the power supply of FIG. 1.

The operation of the short circuit protection module 20 can best be explained with reference to FIG. 4. When a short circuit condition occurs on the board of the power supply 10, at a time $t_0$, there is a sudden decrease in the power plane voltage $V_{PP}$. Accordingly, the power plane voltage reference signal $V_A$ drops as indicated by curve 51. In comparison to the power plane voltage reference signal $V_A$, the output voltage reference signal $V_B$ remains essentially constant, as indicated by curve 53, because the reference signal $V_B$ is a function of the output voltage $V_P$ of the power supply 10.

At a time $t_1$, the reference signal $V_A$ has fallen to the level of reference signal $V_B$. In response to this condition, the output port 37 goes from HIGH to LOW, as indicated by curve 55, and this causes the status signal line 19 to go from LOW to HIGH, indicating a short-circuit condition to the power supply 10. The period of time from the drop in power plane voltage $V_{PP}$ until the reference signal $V_A$ has fallen to the level of the reference signal $V_B$ (i.e., the time interval $t_1$–$t_0$), is determined by the time delay induced by the first time constant subcircuit 23 and the normal voltage differential ($V_A$–$V_B$). In a preferred embodiment, this induced time delay is approximately 500 $\mu$sec.

As can be appreciated by one skilled in the relevant art, changes in the voltage levels of reference signals $V_A$ and $V_B$ can also be the result of noise produced by switching activity. These noise signals have very fast rise/fall times and very short durations, typically less than 500 $\mu$sec. In particular, the ringing which occurs during normal power-up has a period of about 100 $\mu$sec. By comparison, it has been found empirically that short-circuit events have a duration of about 500 to 1500 $\mu$sec. By incorporating the induced time delay of 500 $\mu$sec into the short circuit protection module 20, high-frequency noise produced by switching activity is effectively filtered out while the short circuit protection module 20 is still able to detect the occurrence of a short circuit condition.

Figure 5:
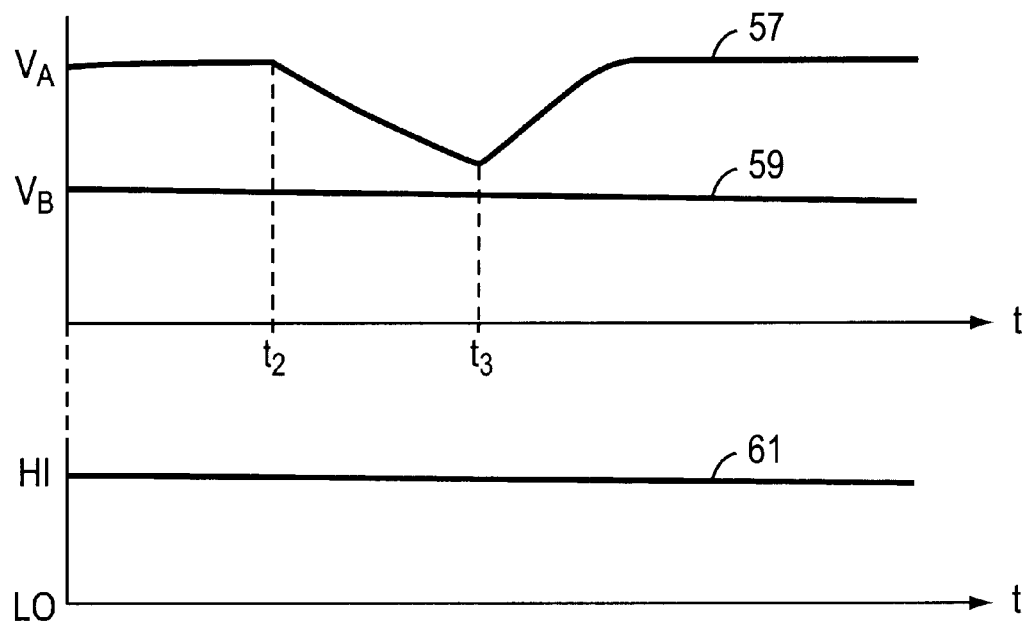
FIG. 5 is a set of curves generated in response to the presence of high-frequency switching noise in the power supply of FIG. 1.

This filtering function can be explained by the graphs in FIG. 5, which illustrates that the reference signal $V_A$ drops, at time $t_2$, in response to a drop in the power plane voltage $V_{PP}$ due to high-frequency noise. The high-frequency noise signal terminates at a time $t_3$ (where $(t_3-t_2)<500$ $\mu$sec), and the reference signal $V_A$ returns to the normal voltage level, as indicated by curve 57. Because the curve 57 did not reach the level of the reference signal $V_B$, indicated by curve 59, the output of the comparator 31 remained HIGH, as indicated by curve 61.

Referring again to FIG. 2, a preferred embodiment of the short circuit protection module 20, used in conjunction with voltages $V_P$ and $V_{PP}$ of 3.3 V, includes the following component values. For the first voltage divider 21, a first resistance 71 of about 30.1 K$\Omega$ and a second resistance 73 of about 23.2 K$\Omega$. For the second voltage divider 25, a first resistance 81 of about 3.01 K$\Omega$ and a second resistance 83 of about 1.27 K$\Omega$.

It is a further requirement of the short circuit protection module 20 that, even during a normal power-down of the power supply 10, the output voltage reference signal $V_B$ at the inverting input port 35 continue to remain at a lower potential than the power plane voltage reference signal $V_A$ at the non-inverting input port 33. Otherwise, an erroneous signal, or 'glitch,' indicating a short circuit condition, would be placed on the status signal line 19 during the power-down. To meet this requirement, a controlled low forward voltage device, such as a diode 29, is emplaced across the second time constant subcircuit 27, as shown in FIG. 2. The diode 29 allows the capacitance 89 to discharge and to follow the decreasing voltage level of the power supply output voltage $V_P$.

Figure 6:
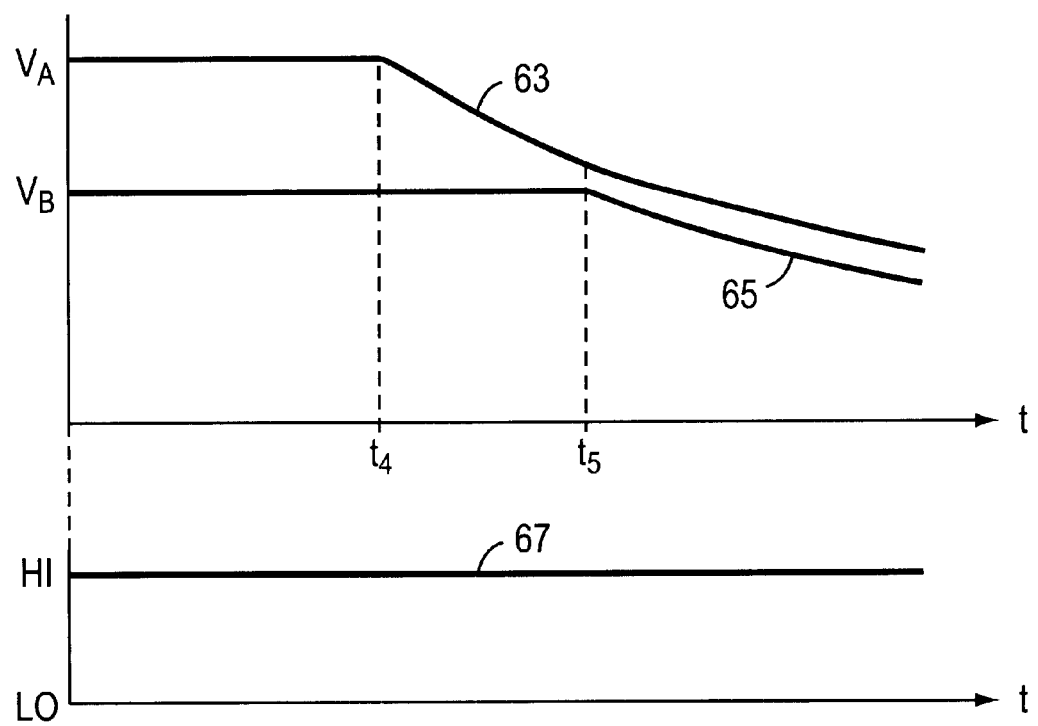
FIG. 6 is a set of curves generated in response to the physical removal of the power supply from the system of FIG. 1.

If the power supply 10 is removed while the rest of the electronic system continues to operate, the reference signal $V_A$, which is related to the power plane voltage $V_{PP}$ on the voltage reference line 17, decays as indicated by curve 63, in FIG. 6. The reference signal $V_B$, which is related to the output voltage $V_P$ on the module power line 15, decays as indicated by curve 65. The fall-off in the reference signal $V_A$ occurs at a time $t_4$, which is determined by the first time constant subcircuit 23, and the fall-off in the reference signal $V_B$ occurs at a time $t_5$, which is determined by the second time constant subcircuit 27. In a preferred embodiment, the values for the resistance 85 and the capacitance 89 are specified such that the time interval $(t_5-t_4)$ is approximately 1500 $\mu$sec. Accordingly, the curve 63 does not cross curve 65 and the output of the comparator 31 remains HIGH, as indicated by curve 67.

Additionally, to prevent the voltage of reference signal $V_A$ from dropping below the voltage level of the reference signal $V_B$, the diode 29, in FIG. 2, functions to clamp the voltage level of the reference signal $V_A$ a predetermined value, such as 100 millivolts for example, below the voltage level of the reference signal $V_B$. With this configuration, the output of the comparator 31 will remain HIGH, and no short-circuit signal will be transmitted when the power is intentionally withdrawn by either removing or normally powering down the power supply.

Figure 7:
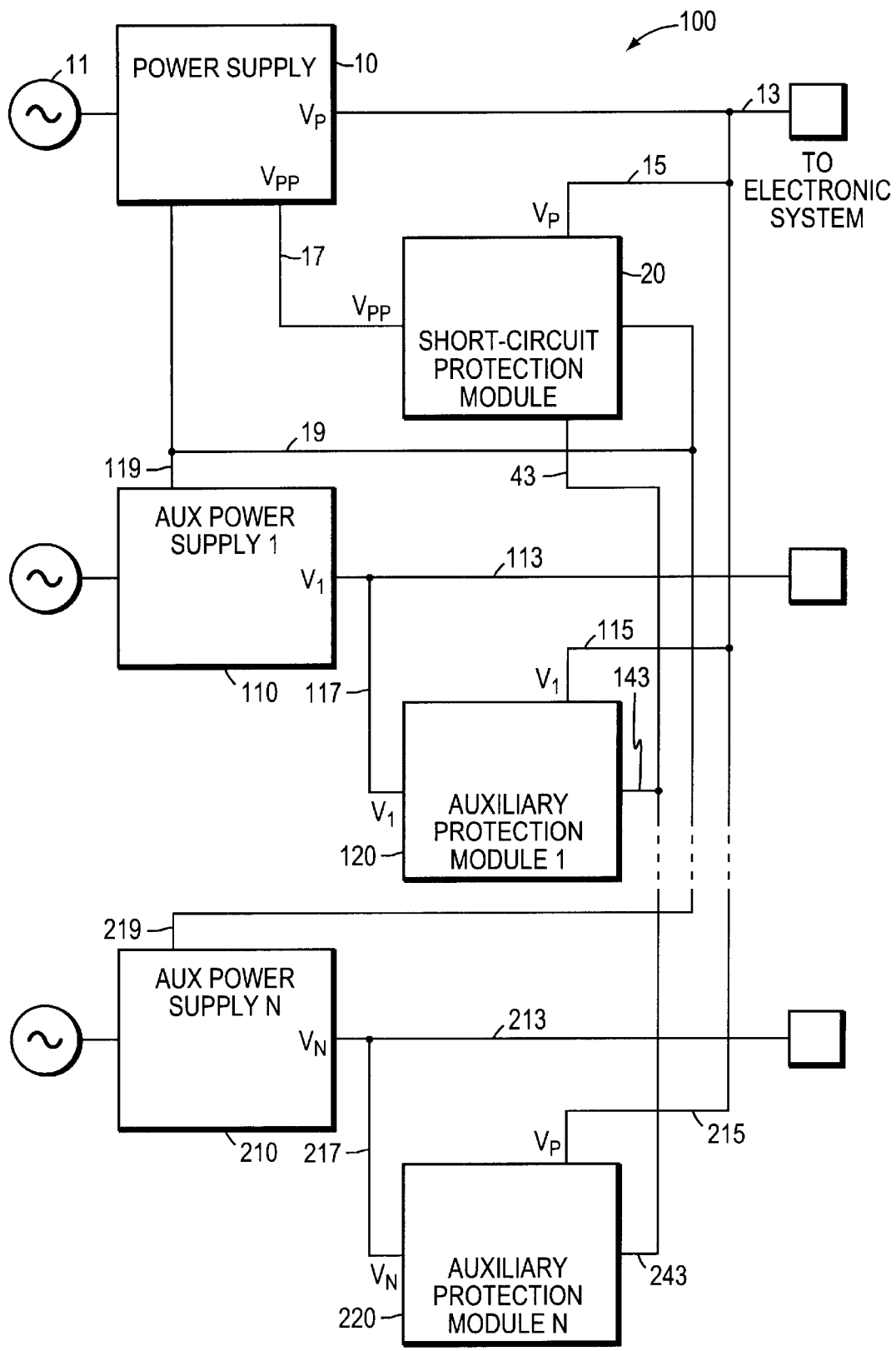
FIG. 7 is a block diagram showing a power supply system including the power supply and short-circuit protection module of FIG. 1 and a plurality of auxiliary power supplies and protection modules.

In a typical application, an electronic system may utilize a power supply system 100 having two or more power supplies producing different voltage outputs, as shown in FIG. 7. The power supply system 100 includes the power supply 10, the short-circuit protection module 20, and a first through $n^{th}$ auxiliary power supply 110 through 210, respectively. The first auxiliary power supply 110 provides voltage of $V_1$ to the electronic system (not shown) over a first auxiliary output line 113, and the $n^{th}$ auxiliary power supply 210 provides voltage of $V_N$ over an $n^{th}$ auxiliary output line 213. Short circuit protection for the first auxiliary power supply 110 is provided by an auxiliary protection module 120, and short circuit protection for the $n^{th}$ auxiliary power supply 210 is provided by an $n^{th}$ protection module 220.

The first auxiliary protection module 120 monitors voltage $V_1$ via a first auxiliary voltage reference line 117 and provides a corresponding signal on a first auxiliary signal line 143. Power for operation of the first auxiliary protection module 120 is provided by the power supply 10 via a first auxiliary module power line 115. The first auxiliary signal line 143 is connected to the comparator input line 43 of the short circuit protection module 20. The status signal line 19 of the short circuit protection module 20 is connected to the first auxiliary power supply 110 via a first auxiliary status line 119.

Similarly, the $n^{th}$ auxiliary protection module 220 monitors voltage $V_N$ via an $n^{th}$ auxiliary voltage reference line 217 and provides a corresponding signal on an $n^{th}$ auxiliary signal line 243. Power for operation of the $n^{th}$ auxiliary protection module 220 is provided by the power supply 10 via an $n^{th}$ auxiliary module power line 215. The no auxiliary signal line 243 is also connected to the comparator input line 43 of the short circuit protection module 20. Additionally, the status signal line 19 of the short circuit protection module 20 is connected to the $n^{th}$ auxiliary power supply 210 via an $n^{th}$ auxiliary status line 219. With the configuration shown, a logic LOW signal on any of the auxiliary signal lines 143 through 243 produces a HIGH logic signal on the status signal line 19 and causes a shutdown of the power supply 10 and/or one or more of the auxiliary power supplies 110 through 210.

Figure 8:
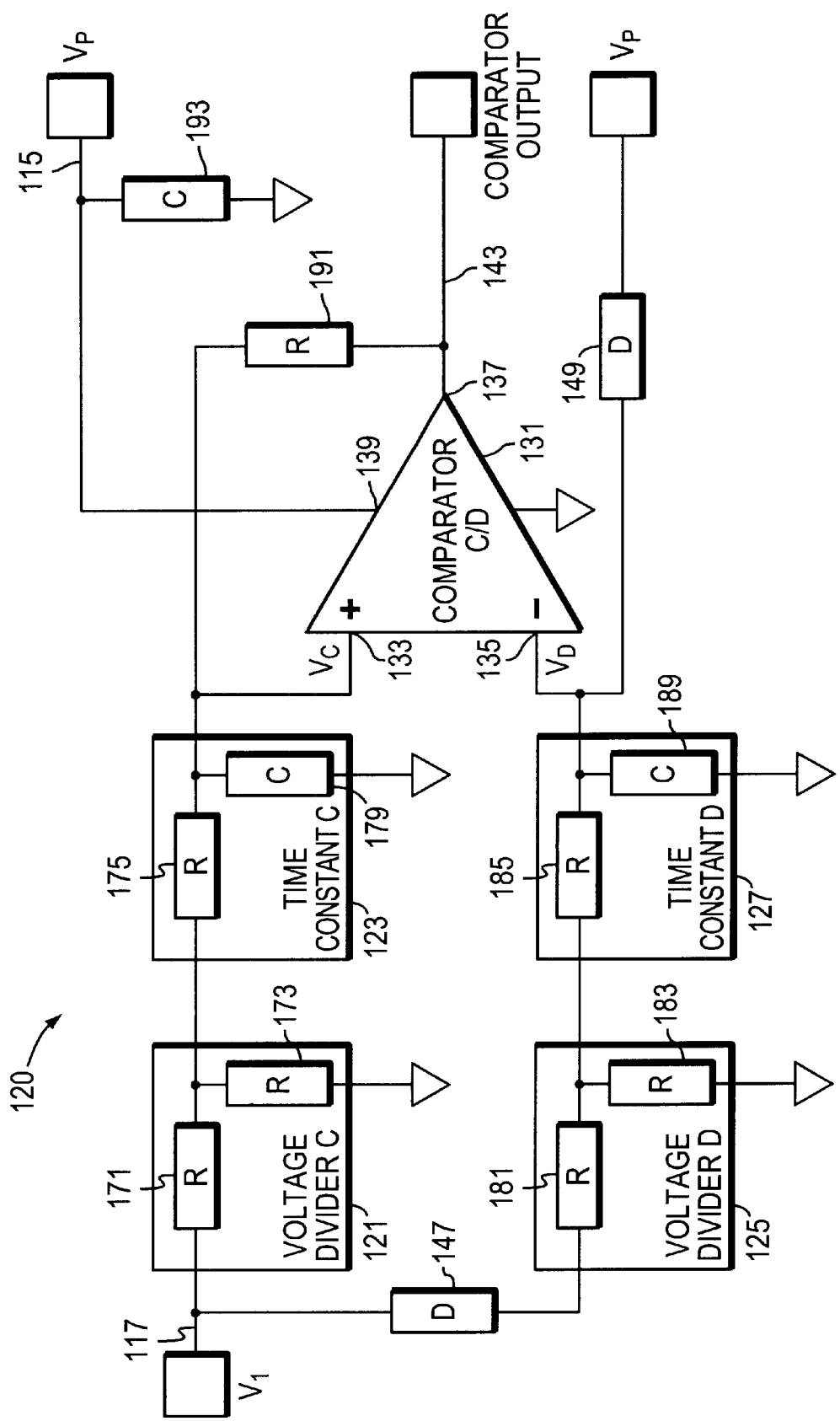
FIG. 8 is a detailed block diagram of one of the auxiliary protection modules of FIG. 7.

The design of the auxiliary protection modules 120 through 220 can be explained with reference to FIG. 8 which shows the components of the first auxiliary protection module 120. The short circuit protection module 120 includes a first voltage divider 121 for receiving the voltage of $V_1$ from the first auxiliary power supply 110 on the first auxiliary voltage reference line 117. The first voltage divider 121 provides a first auxiliary voltage reference signal $V_C$ to the non-inverting input 133 of a comparator 131. A first time constant subcircuit 123 provides for a delay to the first auxiliary voltage reference signal $V_C$. The output voltage $V_P$ is provided to a power supply pin 139 of the comparator 131 via the first auxiliary module power line 115 as shown. A capacitance 193 is provided in accordance with standard design practice.

The short circuit protection module 120 also includes a second voltage divider 125 for receiving the voltage $V_1$ (i.e., the reference voltage) via a controlled forward voltage device, such as a diode 147. The second voltage divider 125 provides a second signal $V_D$ to the inverting input 135 of the comparator 131 via a second time constant subcircuit 127. If, during operation of the short circuit protection module 120, the first auxiliary voltage reference signal $V_C$ at the non-inverting input 133 drops below the level of the second auxiliary voltage reference signal $V_D$ at the inverting input 135, a corresponding short circuit status signal is sent onto a comparator output signal line 143, in a method similar to the operation of the short-circuit protection module 20, described above.

The component values for the time constant subcircuits 123 and 127 are specified such that the delay of the reference signal $V_D$ at the inverting input 135 is greater than the delay the reference signal $V_C$ at the non-inverting input 133. With reference signals $V_C$ and $V_D$ HIGH, output port 137 of the comparator 131 is also HIGH. A feedback resistance 191 is provided between the output port 137 and the non-inverting input 133 to provide a positive feedback configuration. When a short circuit condition is detected, the output port 137 becomes LOW. A clamping diode 149 is provided at the inverting input 135 as shown so as to prevent the generation of an erroneous signal, indicating a short circuit condition, during removal of or a normal power down of the first auxiliary power supply 110. The clamping diode 149 discharges a capacitance 189 during a normal power down and prevents the output of the comparator 131 from 'glitching' during this condition.

The values of the component elements of the short-circuit protection module 120 are specified using design criteria similar to those in the short circuit protection module 20. For a voltage $V_1$ of 2.5 V, for example, the first voltage divider 121 may include resistance 171 of about 8.87 KΩ and resistance 173 of about 9.09 KΩ. The second voltage divider 125 may include resistance 181 of about 365 KΩ and resistance 183 of about 301 KΩ. In yet another embodiment, for a voltage $V_1$ of 1.5 V, the auxiliary protection module 120 may include resistance 171 of about 20 KΩ, resistance 173 of about 40.2 KΩ, resistance 181 of about 40.2 KΩ, and resistance 183 of about 301 KΩ.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A short circuit protection device suitable for use with a power supply, said device comprising:
    a comparator having a non-inverting input port, an inverting input port, and an output port;
    a first voltage divider connected to the power plane of the power supply, said first voltage divider configured to provide a first reference signal to said non-inverting input port from said power plane voltage;
    a first time constant connected between said first voltage divider and said non-inverting input port, said first time constant for adding a first time delay to said first reference signal;
    a second voltage divider connected to the power supply output, said second voltage divider configured to provide a second reference signal to said inverting input port from said power supply output voltage, said second reference signal having a smaller voltage level than said first reference signal; and
    a second time constant connected between said second voltage divider and said inverting input port, said second time constant for adding a second time delay to said second reference signal, said second time delay being greater than said first time delay;
    such that i) a first logic state is present at said output port when said first reference signal voltage level remains greater than said second reference signal voltage level and ii) a second logic state, indicating the presence of a short circuit condition in the power supply, is produced at said output port when said first reference signal voltage level and said second reference signal voltage level are the same.

2. The short circuit protection device of claim 1 further comprising a feedback resistance connected between said comparator output port and said non-inverting input port.

3. The short circuit protection device of claim 1 wherein said comparator comprises an analog device.

4. The short circuit protection device of claim 3 wherein said first reference signal is approximately 100 millivolts greater than said second reference signal.

5. The short circuit protection device of claim 1 wherein said first time delay is approximately 500 microseconds.

6. The short circuit protection device of claim 1 wherein said second time delay is approximately 1500 microseconds.

7. The short circuit protection device of claim 1 further comprising a fault signal subcircuit connected to said comparator output port, said comparator providing a logic signal to said fault signal subcircuit.

8. The short circuit protection device of claim 7 wherein said fault signal subcircuit includes a first transistor and a second transistor, said first transistor held at the same logic state as said comparator logic signal and said second transistor held at a different logic state from said comparator logic signal.

9. The short circuit protection device of claim 8 wherein said fault signal subcircuit is connected to the power supply output, the power supply providing operating power to said fault signal subcircuit.

10. The short circuit protection device of claim 9 wherein said fault signal subcircuit further includes a third time constant connected between said transistors and the power supply output.

11. The short circuit protection device of claim 1 further comprising a diode connected b et ween said second voltage divider and said inverting input port.

12. The short circuit protection device of claim 1 further comprising a module power line impedance connected between the power supply output and a power supply pin of said comparator.

13. A short circuit protection device suitable for use with a power source for monitoring a power supply, said device comprising:
    a comparator having a non-inverting input port, an inverting input port, an output port, and a power supply pin, said power supply pin connected to the power source;
    a first voltage divider connected to the power supply output, said first voltage divider configured to provide a first reference signal to said non-inverting input port from said power supply voltage;
    a first time constant connected between said first voltage divider and said non-inverting input port, said first time constant for adding a first time delay to said first reference signal;
    a diode connected to the power supply output;
    a second voltage divider connected to said diode, said second voltage divider configured to provide a second reference signal to said inverting input port from said power supply output voltage, said second reference signal having a smaller voltage level than said first reference signal; and
    a second time constant connected between said second voltage divider and said inverting input port, said second time constant for adding a second time delay to said second reference signal, said second time delay being greater than said first time delay;

such that i) a first logic state is present at said output port when said first reference signal voltage level remains greater than said second reference signal voltage level and ii) a second logic state, indicating the presence of a short circuit condition in the power supply, is produced at said output port when said first reference signal voltage level and said second reference signal voltage level are the same.

14. The short circuit protection device of claim 13 further comprising a feedback resistance connected between said comparator output port and said non-inverting input port.

15. The short circuit protection device of claim 13 wherein said comparator comprises an analog device.

16. The short circuit protection device of claim 13 further comprising a second diode connected between the power source and said inverting input port of said comparator.

17. A short circuit protection system suitable for monitoring two or more power supplies of different voltage outputs, said system comprising:

a first comparator having a non-inverting input port, an inverting input port, and an output port, said first comparator output port connected to a status signal line;

a first voltage divider connected to the power plane of the first power supply, said first voltage divider configured to provide a first reference signal to said non-inverting input port from said power plane voltage;

a first time constant connected between said first voltage divider and said first comparator non-inverting input port, said first time constant for adding a first time delay to said first reference signal;

a second voltage divider connected to the output of the first power supply, said second voltage divider configured to provide a second reference signal to said first comparator inverting input port from said first power supply output voltage, said second reference signal having a smaller voltage level than said first reference signal;

a second time constant connected between said second voltage divider and said first comparator inverting input port, said second time constant for adding a second time delay to said second reference signal, said second time delay being greater than said first time delay;

a second comparator having a non-inverting input port, an inverting input port, an output port, and a power supply pin, said power supply pin connected to the output of the first power supply, said second comparator output port connected to said status signal line;

a third voltage divider connected to the output of the second power supply, said third voltage divider configured to provide a third reference signal to said second comparator non-inverting input port from said second power supply voltage;

a third time constant connected between said third voltage divider and said second comparator non-inverting input port, said third time constant for adding a third time delay to said third reference signal;

a diode connected to the output of the second power supply;

a fourth voltage divider connected to said diode, said fourth voltage divider configured to provide a fourth reference signal to said second comparator inverting input port from said second power supply output voltage, said fourth reference signal having a smaller voltage level than said third reference signal; and a fourth time constant connected between said fourth voltage divider and said second comparator inverting input port, said fourth time constant for adding a fourth time delay to said fourth reference signal, said fourth time delay being greater than said third time delay;

such that i) a first logic state is present at said first comparator output port when said first reference signal voltage level remains greater than said second reference signal voltage level; ii) a second logic state, indicating the presence of a short circuit condition in the first power supply, is produced at said first comparator output port when said first reference signal voltage level and said second reference signal voltage level are the same; iii) said first logic state is present at said second comparator output port when said third reference signal voltage level remains greater than said fourth reference signal voltage level; ii) said second logic state, indicating the presence of a short circuit condition in the second power supply, is produced at said second comparator output port when said third reference signal voltage level and said fourth reference signal voltage level are the same.

18. The short circuit protection system of claim 17 further comprising a fault signal subcircuit connected to said status signal line, said fault signal subcircuit including a first transistor and a second transistor, said first transistor held at the same logic state as said status signal line and said second transistor held at a different logic state from said status signal line.

19. The short circuit protection system of claim 17 wherein said comparators comprise analog devices.

20. The short circuit protection system of claim 17 wherein said first time delay is substantially the same as said third time delay.

21. The short circuit protection system of claim 17 wherein said third time delay is substantially the same as said fourth time delay.

22. A method for providing short circuit protection for a power supply, said method comprising the steps of:

obtaining a first reference signal from the power supply;

obtaining a second reference signal from the power supply, said first reference signal normally having a greater voltage level than said second reference signal;

comparing said first reference signal with said second reference signal by means of a comparator to produce a logic signal output, said logic signal output having a first logic value if said first reference signal voltage level is greater than said second reference signal voltage level, and logic signal output having a second logic value if said first reference signal voltage level and said second reference signal voltage level are the same; and transmitting a short circuit indication signal if said logic signal output has said first logic value.

23. The method of claim 22 further comprising the step of delaying said second reference signal with respect to said first reference signal.

24. The method of claim 22 wherein said step of obtaining a first reference signal from the power supply comprises the steps of:

acquiring the voltage from the power plane of the power supply; and, modifying said power plane voltage by means of a first voltage divider to produce a signal having a voltage level suitable for inputting into said comparator.

25. The method of claim 24 wherein said step of obtaining a second reference signal from the power supply comprises the steps of:

acquiring the output voltage from the power supply; and modifying the output voltage by means of a second voltage divider to produce a signal having a voltage level suitable for inputting into said comparator.

26. The method of claim 25 further comprising the step of clamping the voltage level of said second reference signal a predetermined amount below the voltage level of said first reference signal when the power supply output voltage is withdrawn.

27. The method of claim 22 wherein said step of obtaining a first reference signal from the power supply comprises the steps of:

acquiring the output voltage from the power supply; and modifying the output voltage by means of a first voltage divider to produce a signal having a voltage level suitable for inputting into said comparator.

28. The method of claim 27 wherein said step of obtaining a second reference signal from the power supply comprises the steps of:

acquiring the output voltage from the power supply via a diode in series with the power supply; and modifying the output voltage by means of a second voltage divider to produce a signal having a voltage level suitable for inputting into said comparator.

29. The method of claim 28 further comprising the step of clamping the voltage level at said inverting input when the power supply output voltage is withdrawn.

30. The method of claim 22 further comprising the step of shutting down the power supply following said step of transmitting a short circuit indication signal.

* * * * *